United States Patent [19]

Molnar

[11] Patent Number: 4,754,359

[45] Date of Patent: Jun. 28, 1988

[54] PLUG FOR A CASSETTE

[76] Inventor: Bonnie V. Molnar, 68 Oxford Gardens, London, England, W10 5UN

[21] Appl. No.: 934,561

[22] Filed: Nov. 25, 1986

[30] Foreign Application Priority Data

Jul. 16, 1986 [GB] United Kingdom ............... 8617370
Oct. 3, 1986 [GB] United Kingdom ............... 8623750

[51] Int. Cl.$^4$ .......................................... G11B 23/087
[52] U.S. Cl. ...................................... 360/132; 360/60; 360/137
[58] Field of Search .................. 360/132, 60; 242/198

[56] References Cited

U.S. PATENT DOCUMENTS 3,721,772  3/1973  Miura et al. ..................... 360/132
4,012,011  3/1977  Saito ................................. 360/132
4,665,456  5/1987  Ahlberg et al. ................... 360/132

FOREIGN PATENT DOCUMENTS 2824796  12/1978  Fed. Rep. of Germany ...... 360/132

Primary Examiner—Robert S. Tupper
Attorney, Agent, or Firm—Burgess, Ryan & Wayne

[57] ABSTRACT

A plug for a cassette without a recording tab is provided. The plug is adapted to be removably fitted into the protecting recess of a cassette. The plug comprises a bung (14) dimensioned to form a friction fit with the internal walls of the recess, and at least one tab (12) which extends away from the bung and is connected thereto. The tab allows the plug to be removed from the recess of the cassette once in place.

10 Claims, 5 Drawing Sheets

PLUG FOR A CASSETTE

BACKGROUND OF THE INVENTION

The present invention relates to a device for allowing a recording to be made on a cassette without a recording tab.

Both video and compact cassettes (which are commonly used for recording music, but are finding increasing use for storing computer infomation, such as computer programs) can be purchased in either prerecorded or blank form. In the latter case, the cassette owner may record on the cassette material which he values, and may wish to protect against accidental erasure. To allow for this, blank video and compact cassettes include a protecting recess formed in one of their side edges, the opening of which is barred by a recording tab. The recording tab can be snapped off from the cassette housing thus exposing the protecting recess which prevents material being recorded on and erased from the cassette as explained below.

Video and audio cassette recorders include a mechanism for detecting whether or not a loaded cassette has a recording tab or not. This mechanism usually consists of a probe which is biased to extend into the protecting recess of the cassette housing (the extended position). However, if a recording tab is present, the probe is prevented from entering the recess, and instead abuts against the tab (the contracted position). The remaining parts of the mechanism sense which of these alternative positions the probe is in, and if it is found to be extended, prevent the recorder from recording on and erasing from the loaded cassette.

A protecting recess is also provided in the housings of pre-recorded cassettes, but without there being a recording tab.

After repeatedly viewing or listening to a prerecorded cassette, or to a recording made on a blank cassette which has been protected, the viewer or listener may become tired of it, and wish to record fresh material in its place. However, because the recording tab is absent, the detecting mechanism prevent the recorder from recording on or erasing material from the cassette as previously explained. Consequently, it is necessary to shield the protecting recess causing the probe to be in its contracted position when the cassette is loaded.

The problem therefore arises of how to satisfactorily shield the recess of a cassette.

Commonly this problem has been solved by attaching sticky tape across the entrance of the recess to mimic the recording tab. However, the sticky tape itself may get pierced where it passes over the recess by the probe of the recorder, or by accident thus rendering the sticky tape ineffective. Consequently, a fresh piece of sticky tape is required. Eventually, the cassette housing becomes unsightly and tacky around the recess and the cassette becomes unpleasant to handle.

In addition, once the sticky tape is attached to the cassette across the recess, it is difficult to peel off.

The use of a plug for blocking the recess of a cassette has been suggested previously. However the plugs hitherto known have been either difficult to remove from the recess once in place or fit so loosely that they easily become detached from the cassette and lost, possibly falling into the drive mechanism of the recorder causing it to break down. Consequently, their use has been dismissed as impractical by those skilled in the art as exemplified by lines 9-14, column 2, of U.S. Pat. No. 4,044,386 (TDK Electronics Co. Ltd.).

OBJECTS AND SUMMARY OF THE INVENTION

In one aspect, the present invention aims to provide a plug for shielding the protecting recess of a cassette without the previously described drawbacks.

According to one aspect of the present invention there is provided a plug adapted for removable fitting into the protecting recess of an audio or video cassette comprising a bung of solid elastomeric material dimensioned to form a friction fit with the internal walls of the recess and at least one tab extending away from the bung and connected thereto for allowing removal of the plug from the recess.

In the description and claims, the protecting recess referred to is the recess in a compact cassette or video cassette which is detectable by a compact cassette player or video cassette player respectivley, which if unbarred, results in the player being prevented from recording on or erasing material from the cassette.

The plug may be made of thermoplastic and/or resilient material, e.g. a PVC type compound.

The plug may also be made out of natural or synthetic rubber.

Preferably, the plug is formed as an integral body by moulding, e.g. injection moulding.

DETAILED DESCRIPTION OF THE PREFERRED EMBODIMENTS

Figure 1:
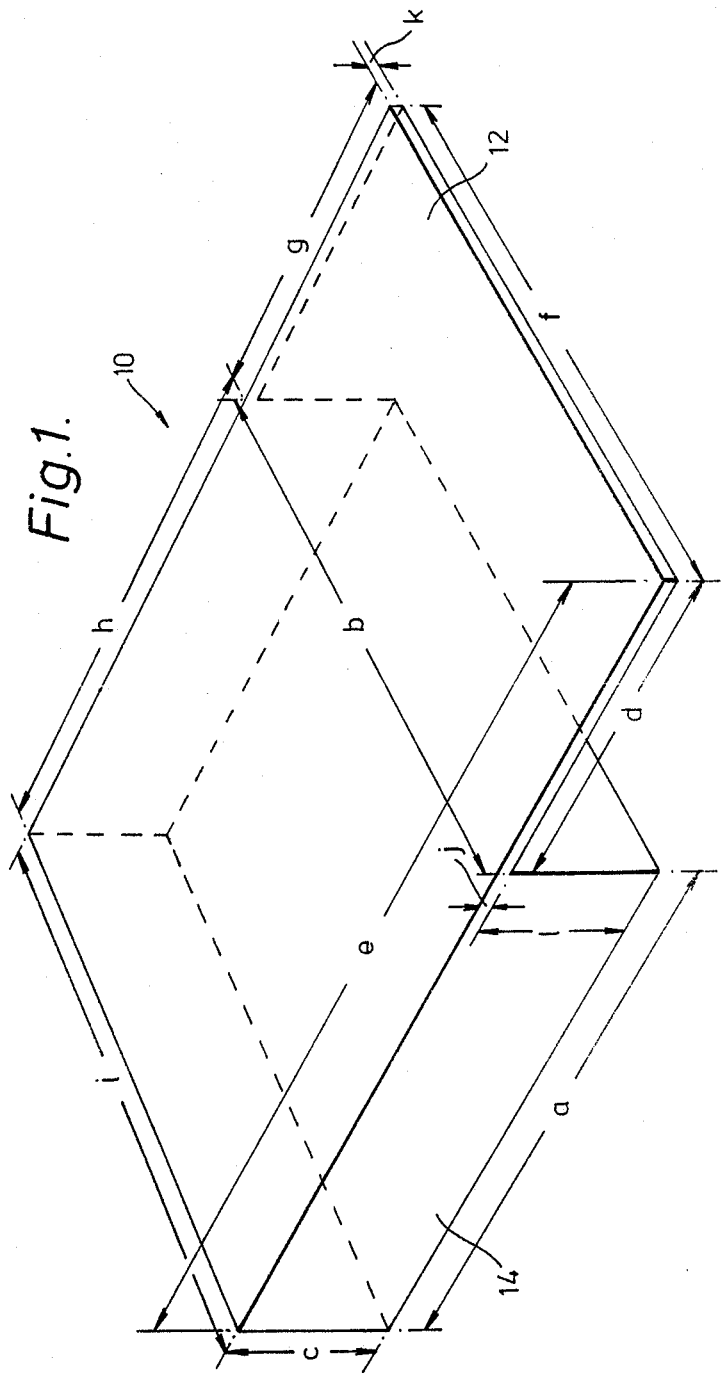
FIGS. 1 and 2 illustrate two perspective views of a plug according to a first embodiment of the invention for use in connection with a video cassette.
Figure 2:
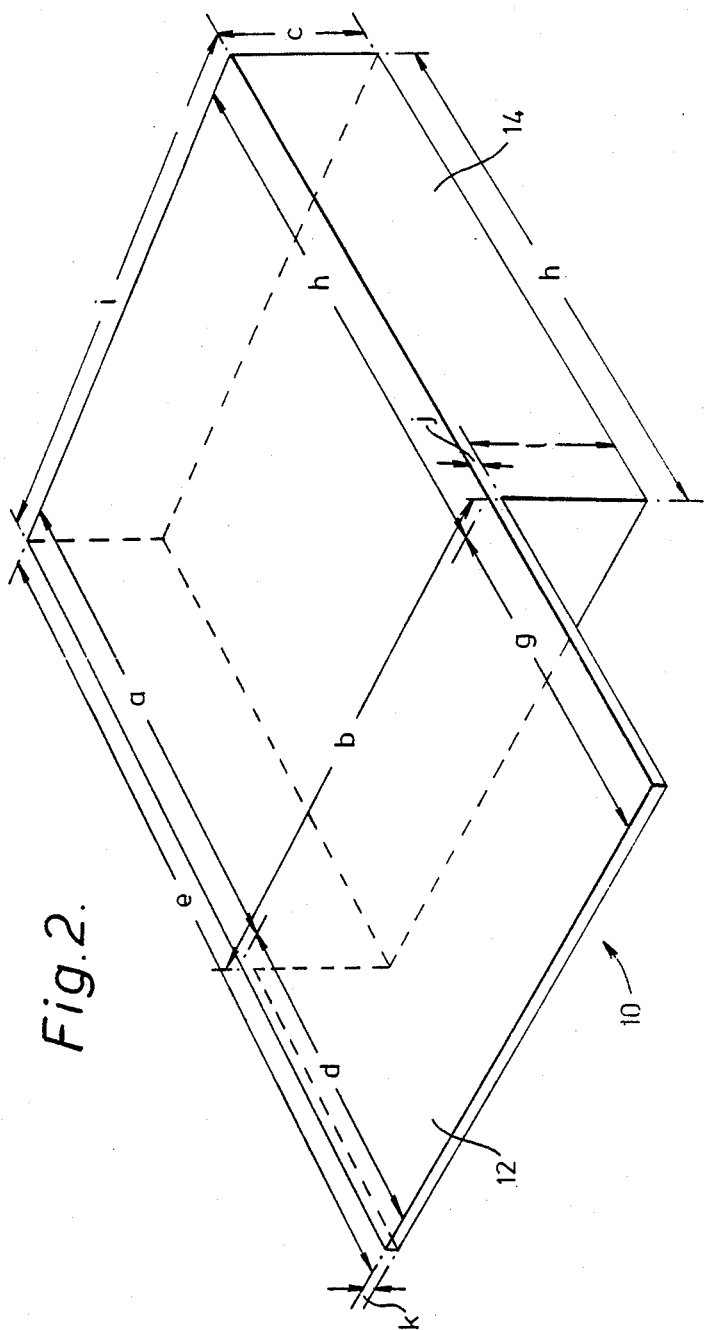

Turning firstly to FIGS. 1 and 2, these illustrate a first embodiment of the plug 10 of the present invention for use in connection with a video cassette. The plug comprises a tab component 12 and a bung component 14. The bung is made out of an elastomeric material such as certain PVC type compounds, and is made slightly larger than the recess for which it is intended so that it is held in place in the recess by a friction fit. This prevents the bung from becoming detached from the cassette when in use and possibly causing damage to the internal workings of the recorder.

The elastomeric material from which the bung is formed allows it to deform sufficiently to permit it to be forced into the protecting recess. Also the surface properties of the material provide an appropriate frictional resistance to displacement.

The tab allows the plug to be withdrawn from the recess by gripping the tab and pulling it away from the recess which in turn pulls the bung out of the recess. The material or materials forming the plug should be sufficiently strong to prevent the tab from tearing away from the bung. As will be appreciated, the tab can be formed in a variety of patterns, the only constraints being that it should be firmly connected to the bung, and that it is of sufficient size to enable it to be gripped by suitable means. Thus, the tab may be rectangular or arcuate in shape, and be of any suitable thickness provided that the necessary strength is provided for, and that it does not prevent the cassette from being correclty loaded in the recorder.

The plug is preferably moulded as an integral body in a process such as vacuum moulding or injection moulding. Suitable materials from which the plug can be formed are natural or synthetic rubber or certain thermoplastic elastomeric compounds such as certain PVC or neoprene type compounds as these have the required physical properties of resiliency, friction and tensile strength. A preferred material is grade 022 Evopreme (Trade Mark) manufactured by Evode Plastics. This is believed to be a PVC type polymeric compound.

In order for the plug to fit into the recesses presently found in VHS video cassettes, the following are its preferred dimensions (±10%, preferably ±5%):

a 10 mm
b 10.5 mm
c 3 mm
d 6.5 mm
e 16.5 mm
f 10.5 mm
g 6.3 mm
h 10.5 mm
i 10.5 mm
j 0.2 mm
k 0.2 mm
l 2.8 mm

Figure 6:
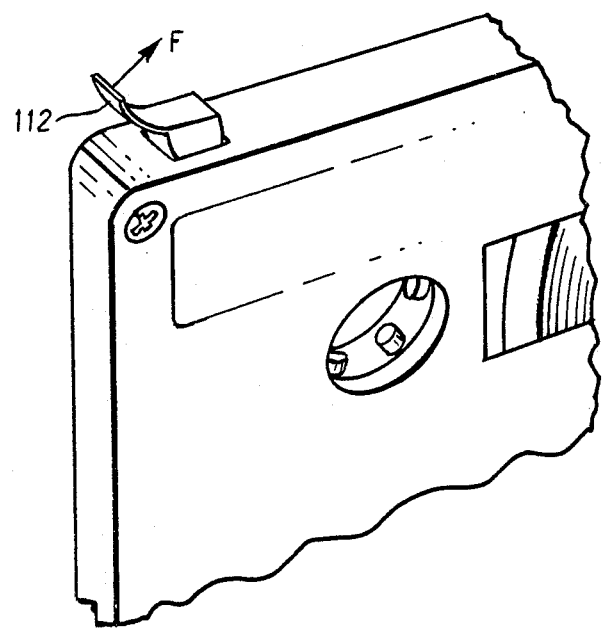
FIG. 6 is a perspective view illustrating the manner in which the plug of FIG. 3 is removed from the recess of a compacet cassette.

In use, the bung portion 14 of the plug is inserted into the open recess of a video cassette. The tap portion of the plug lies along the side of the cassette housing. The relatively small thickness of the tab together with the elastomeric property of the material from which it is formed combine to make the tab extremely flexible. This allows the tab to be peeled away from the side of the cassette giving access to both its sides allowing it to be gripped with e.g. fingers or a pair of tweezers. The tab (112) is then pulled firmly away from the cassette housing by a force F, as illustrated in connection with a compact cassette in FIG. 6, which in turn pulls the bung from the recess.

When the plug is in place in the recess, recordings can be made on the cassette in the normal manner. After recording, the bung can either be left in place in the recess to allow further recordings to be made on the cassette, or it can be removed in the manner described above, thus protecting the material recorded on the cassette from erasure.

Figure 3:
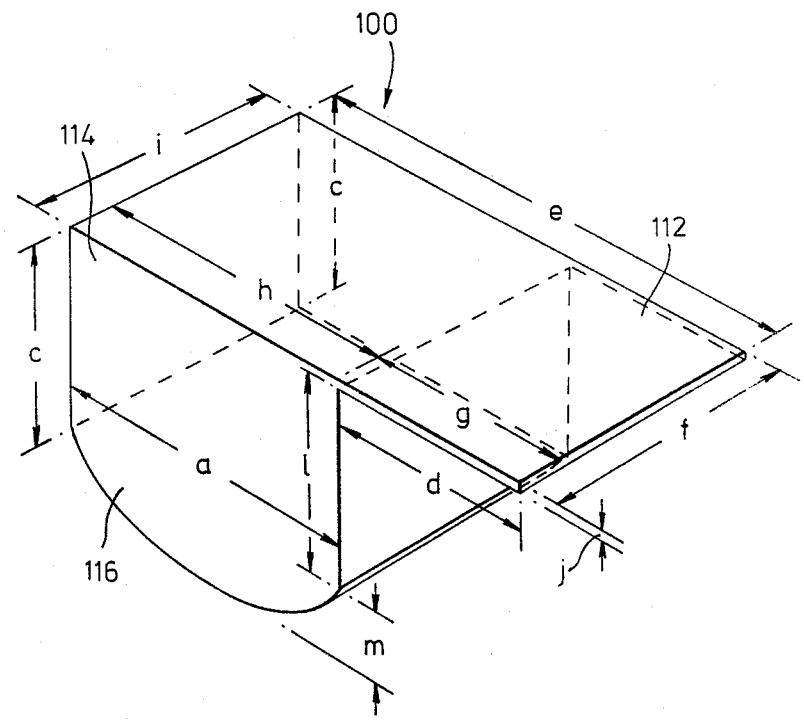
FIG. 3 illustrates a perspective view of a plug according to a second embodiment of the invention for use in connection with a compact cassette.

Turning now to FIG. 3, this illustrates an embodiment of the plug of the invention for use in connection with a compact cassette e.g. an audio cassette. As previously described in connection with the embodiment of the invention illustrated in FIGS. 1 and 2, the plug 100 comprises a tab component 112 and a bung 114. The plug may be formed of the same sort of materials and by the same sort of methods as previously described. However, the dimensions of the plug are different from those of the video plug due to the recesses formed in a compact cassette being smaller and of a different shape, than that found in a video cassette. Again, the bung component is made slightly larger than the recess for which it is intended. In order for the plug to fit into the recesses presently found in compact cassette, the following are its preferred dimensions (±10%, preferably ±5%):

a 6 mm
c 3.7 mm
d 4 mm
e 10 mm
f 5 mm
g 4 mm
h 6 mm
i 5 mm
j 0.05 mm
l 3.65 mm
m 1.5 mm

The arc forming the base of the bung preferably has a length of about 7 mm.

As illustrated in FIG. 3, the base of the bung is preferably formed as part of a cylinder 116 (that is an elongate body of arcuate cross-section) in order to adapt it to the shape of recesses presently found in compact cassettes. However, it is equally practicable to form the base of the bung into a peg shape provided that a friction fit is still provided between the bung and the recess of the cassette when the plug is in use.

The plug is used in the same way as the video cassette plug described above.

Figure 4:
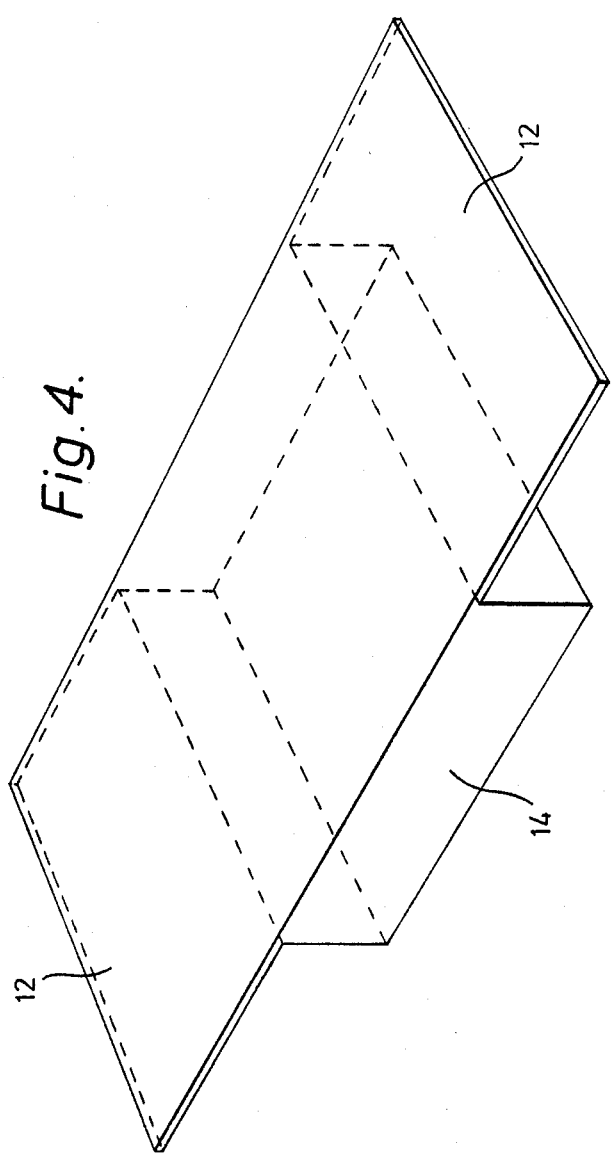
FIGS. 4 and 5 illustrate further perpective views of two further embodiments of the invention for use in connection with a video cassette.

Turning to FIG. 4, this illustrates an embodiment of the invention for use in connection with a video cassette having a bung 14 and two tabs 12. Such an embodiment is particularly useful if the tabs are made of very thin material which might break at their junction with the bung. Thus the second tab is provided as a safeguard in case the first tab breaks. A tab which extends on all sides around the bung could also be used.

Figure 5:
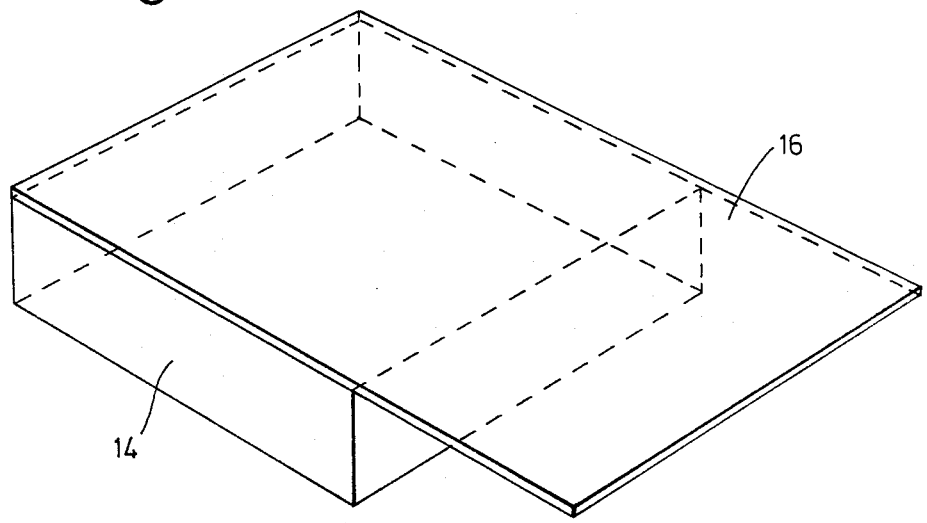

The embodiment shown in FIG. 5 illustrates a two-piece construction of a plug for use in connection with a video cassette according to another embodiment of the present invention. As previously described, a bung 14 is provided for fitting into the recess of a video cassette. A layer 16 of suitable flexible but strong material such as rubber or cloth is then adhered to the top surface of the bung by e.g. adhesive, to form the plug illustrated. The plug may be used in the same manner as those previously described.

I claim:

1. A plug adapted for removable fitting into a protecting recess of a cassette, comprising a bung formed by a single projection of solid elastomeric materila being dimensioned to form a friction fit with the internal walls of the recess and at least one tab which is formed integrally with the bung and which extends away from the bung for allowing removal of the plug from the recess.

2. A plug according to claim 1 wherein at least one of the bung and the tab is formed from a thermoplastic elastomeric material.

3. A plug according to claim 2 wherein the thermoplastic elastomeric compound is a PVC type compound.

4. A plug according to claim 1 for use in connection with a video cassette.

5. A plug according to claim 4, wherein the plug conforms in depth to the depth of the recess.

6. A plug according to claim 1, wherein said bung and at least one tab are integrally formed by injection molding.

7. A plug according to claim 1, wherein said bung and at least one tab are bonded together.

8. A plug according to claim 1 wherein the bung is shaped in conformity with the internal shape of the recess.

9. a plug according to claim 1 which consists of a bung and a single tab.

10. A plug adapted for removable fitting into the protecting recess of a cassette comprising a bung formed by a single projection of solid elastomeric material and of conformal cross-sectional shape as the recess, the bung being dimensioned to form a friction fit with the internal walls of the recess and at least one tab which is a piece of cloth bonded by adhesive to the bung which extends away from the bung for allowing removal of the plug from the recess.

* * * * *